March 17, 1931.  G. F. HOCHRIEM ET AL  1,796,370
WEIGHING MACHINE
Filed June 26, 1928  15 Sheets-Sheet 1
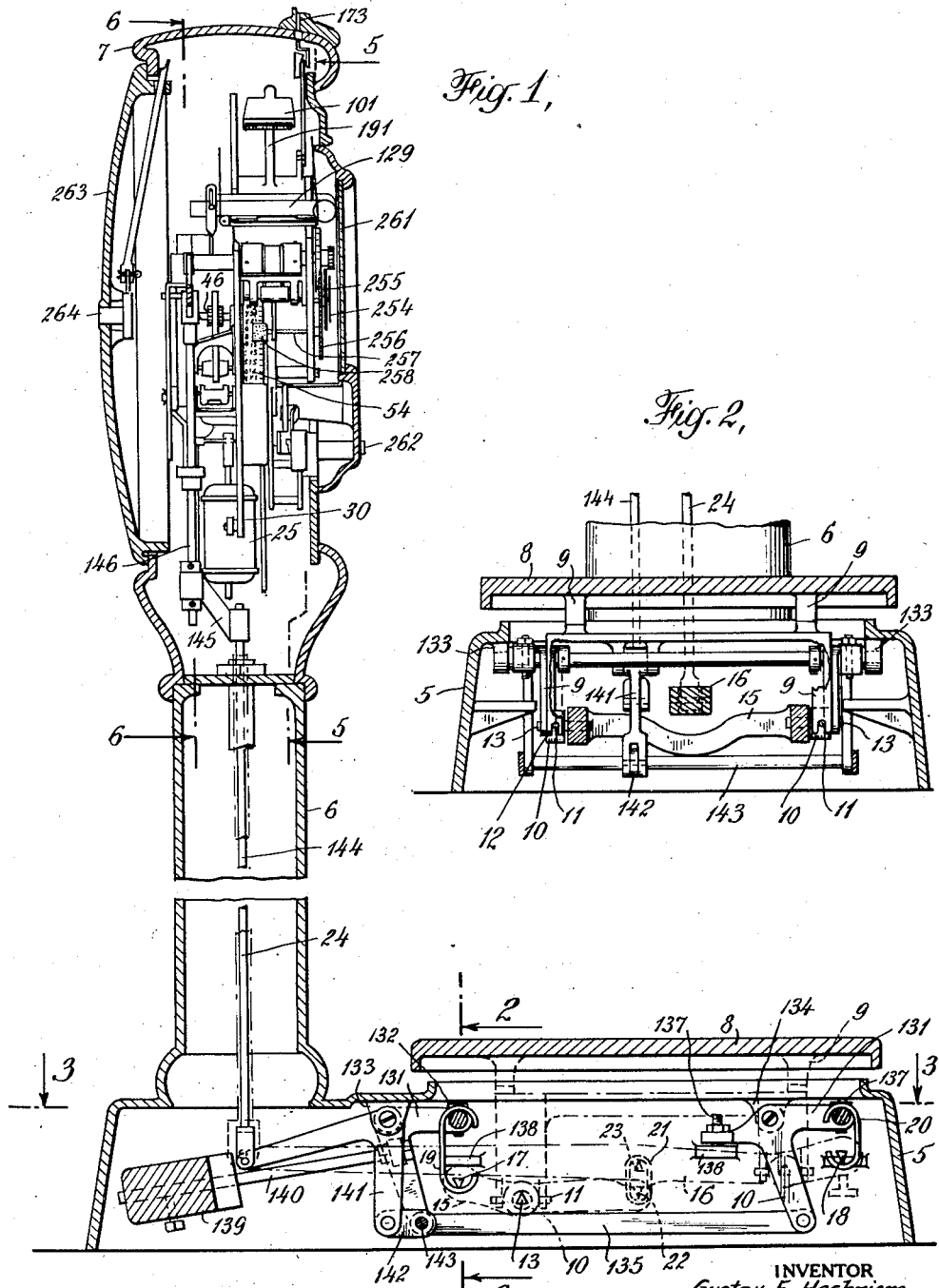
INVENTOR
Gustav F. Hochriem
Frank S. Deschermeier
BY
ATTORNEYS

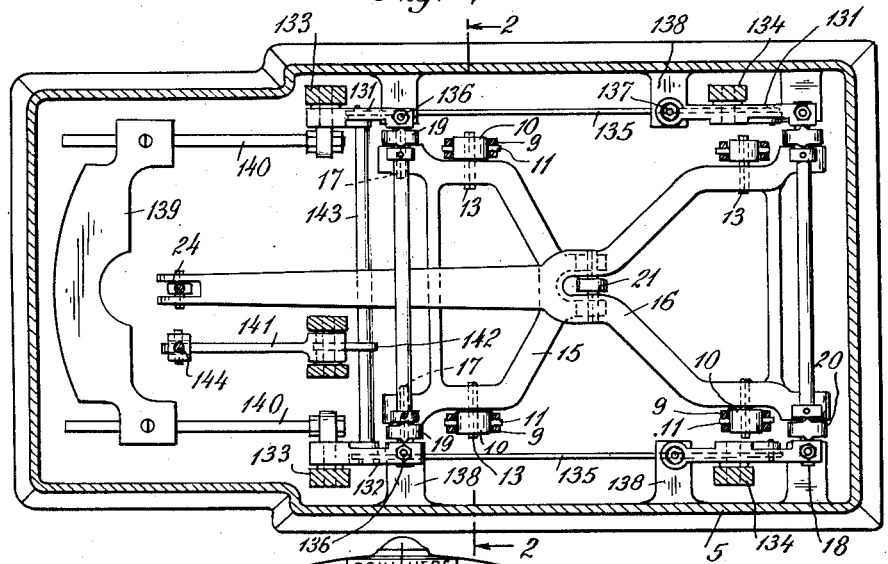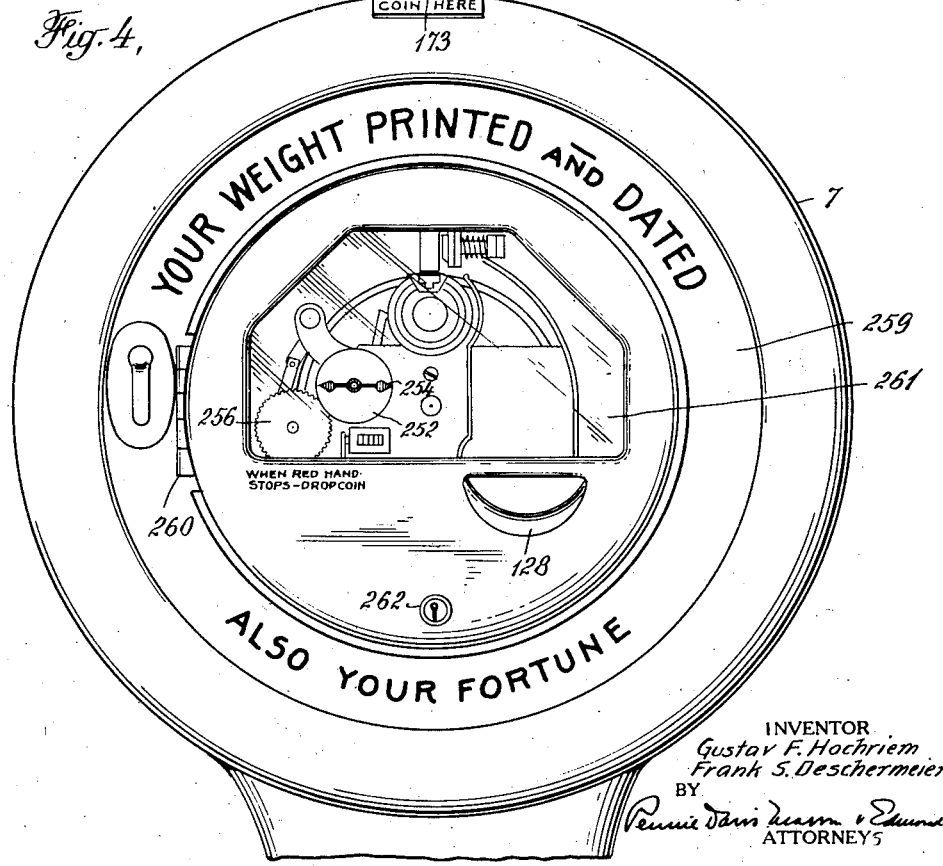

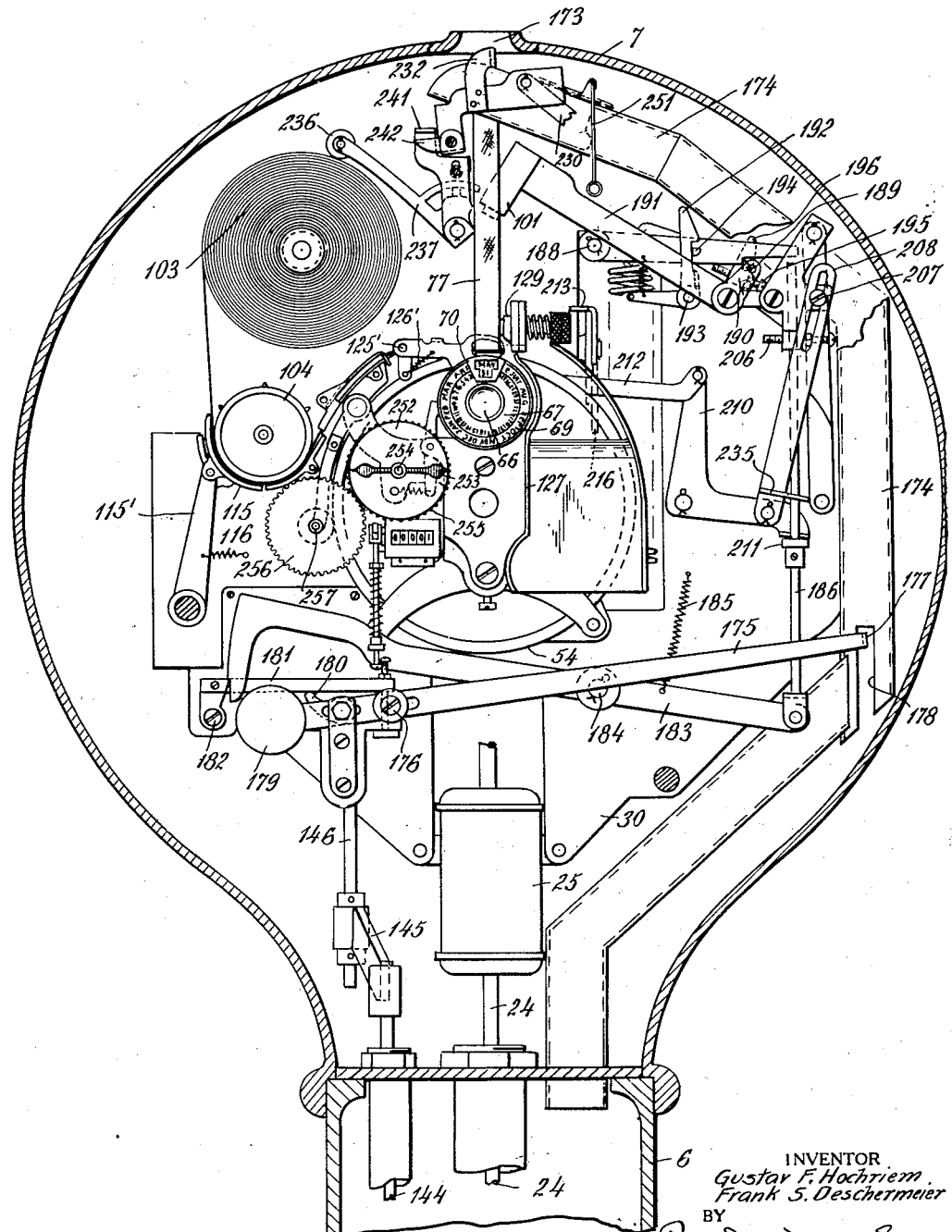

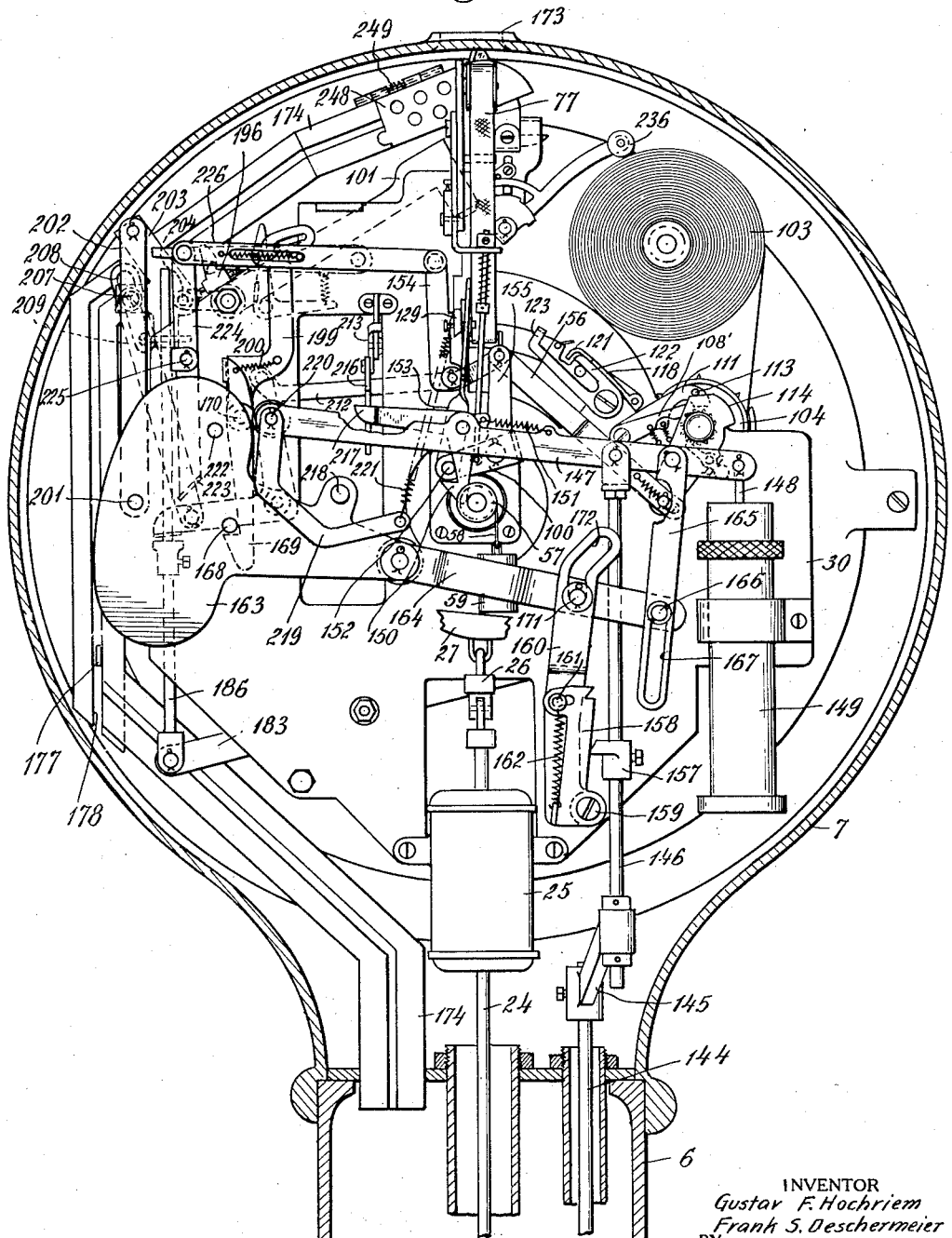

March 17, 1931.  G. F. HOCHRIEM ET AL  1,796,370
WEIGHING MACHINE
Filed June 26, 1928   15 Sheets-Sheet 5

INVENTOR
Gustav F. Hochriem
Frank S. Deschermeier
BY
Pennie Davis Marvin & Edmonds
ATTORNEYS

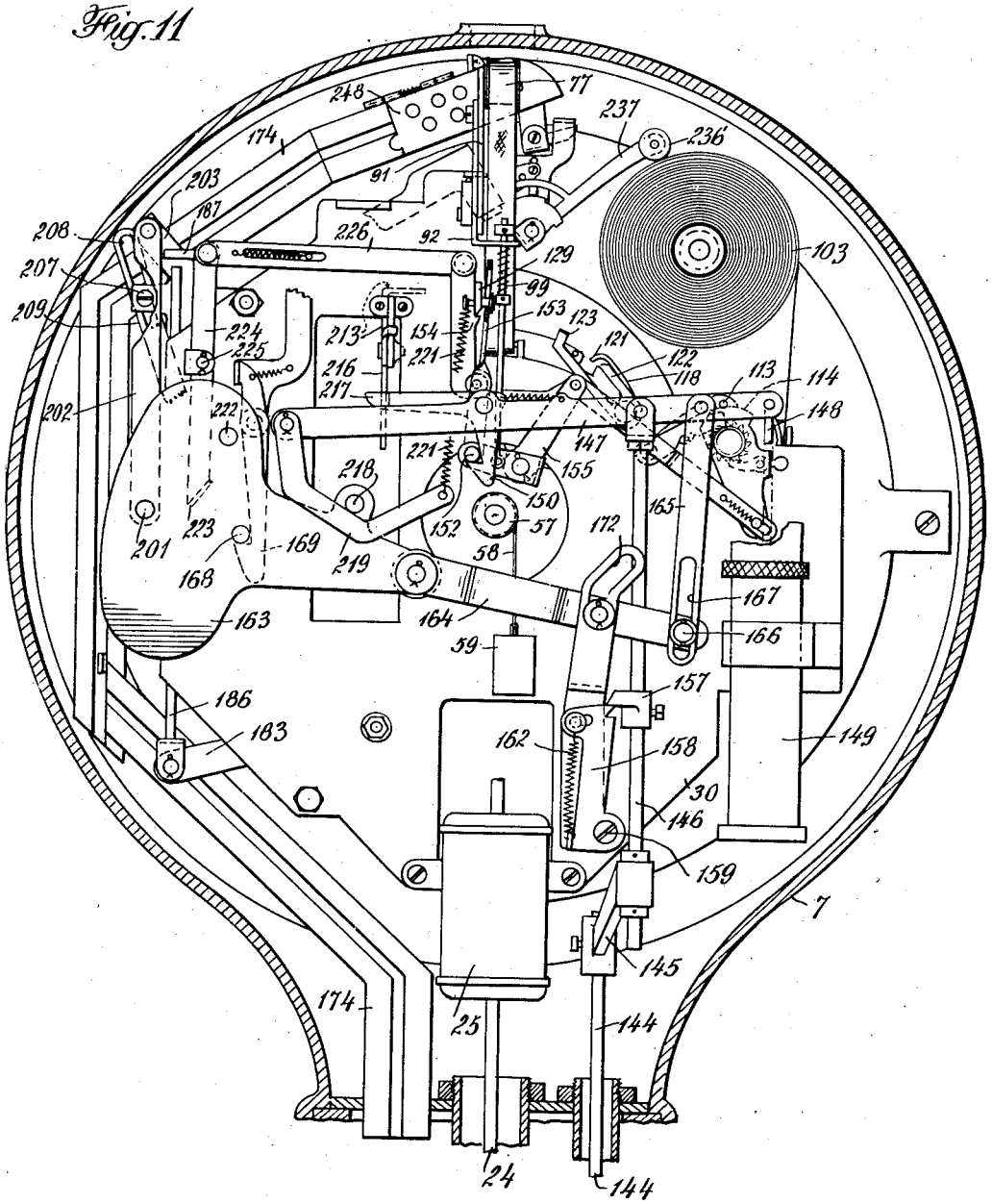

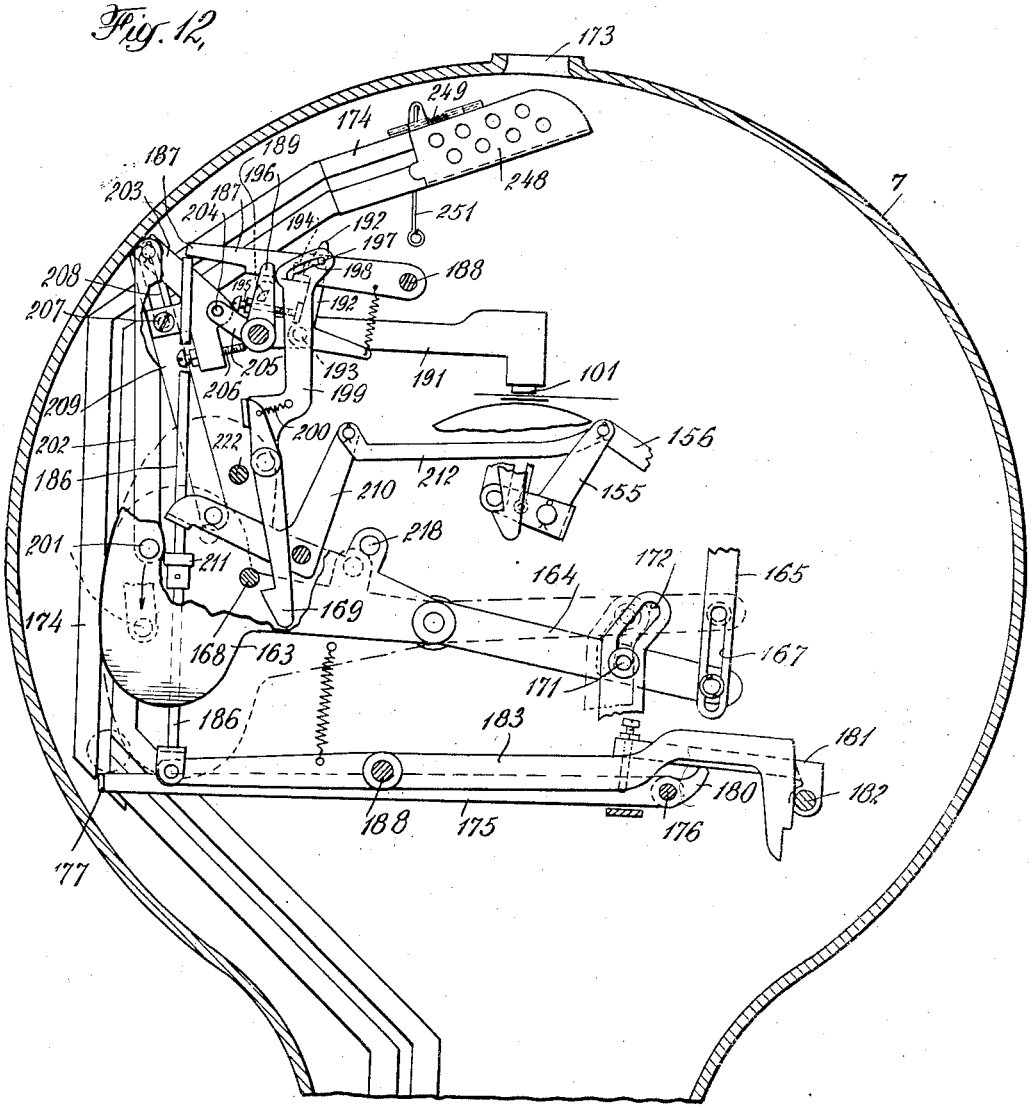

March 17, 1931.  G. F. HOCHRIEM ET AL  1,796,370
WEIGHING MACHINE
Filed June 26, 1928   15 Sheets-Sheet 10
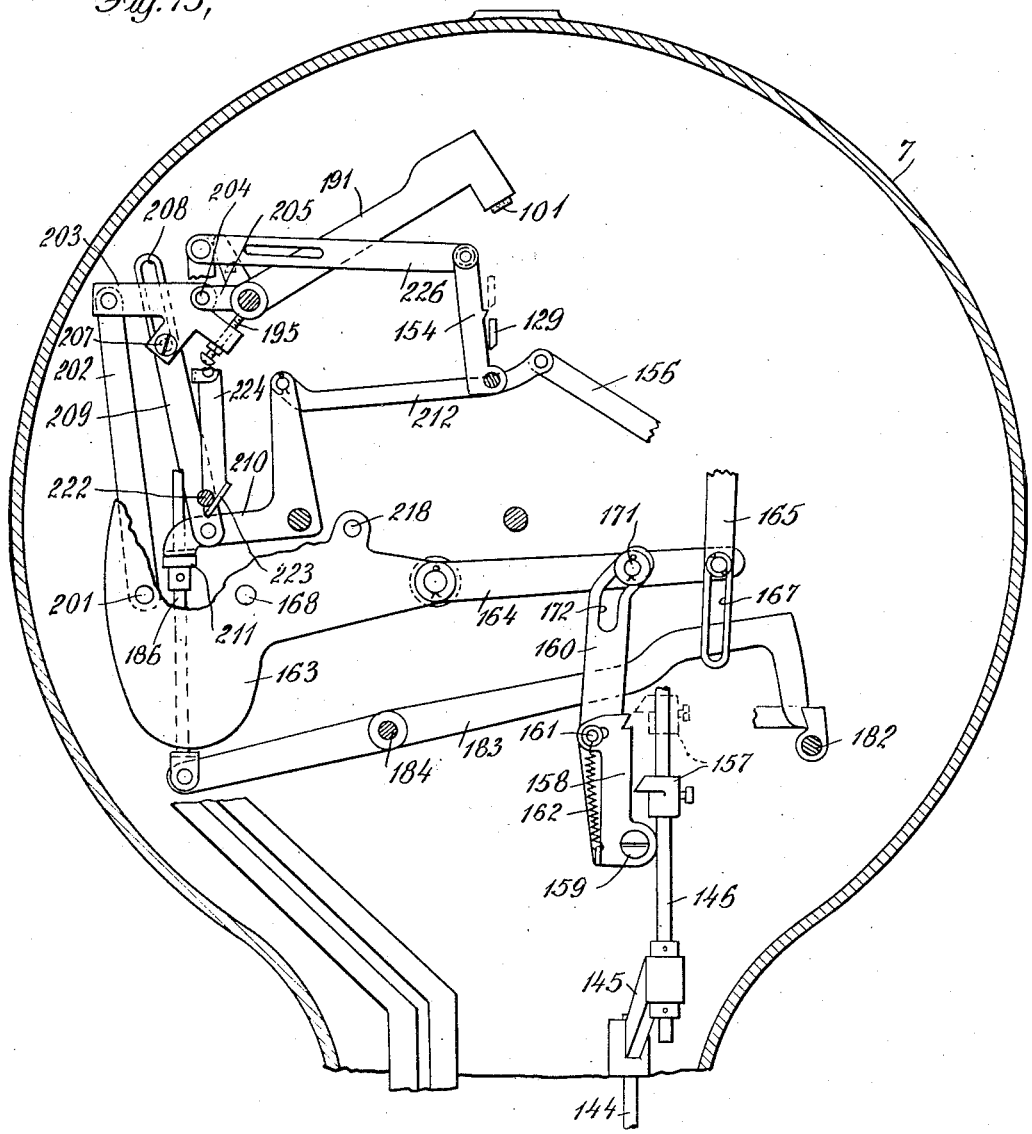
Fig. 13,
INVENTOR
Gustav F. Hochriem
Frank S. Deschermeier
BY
ATTORNEYS

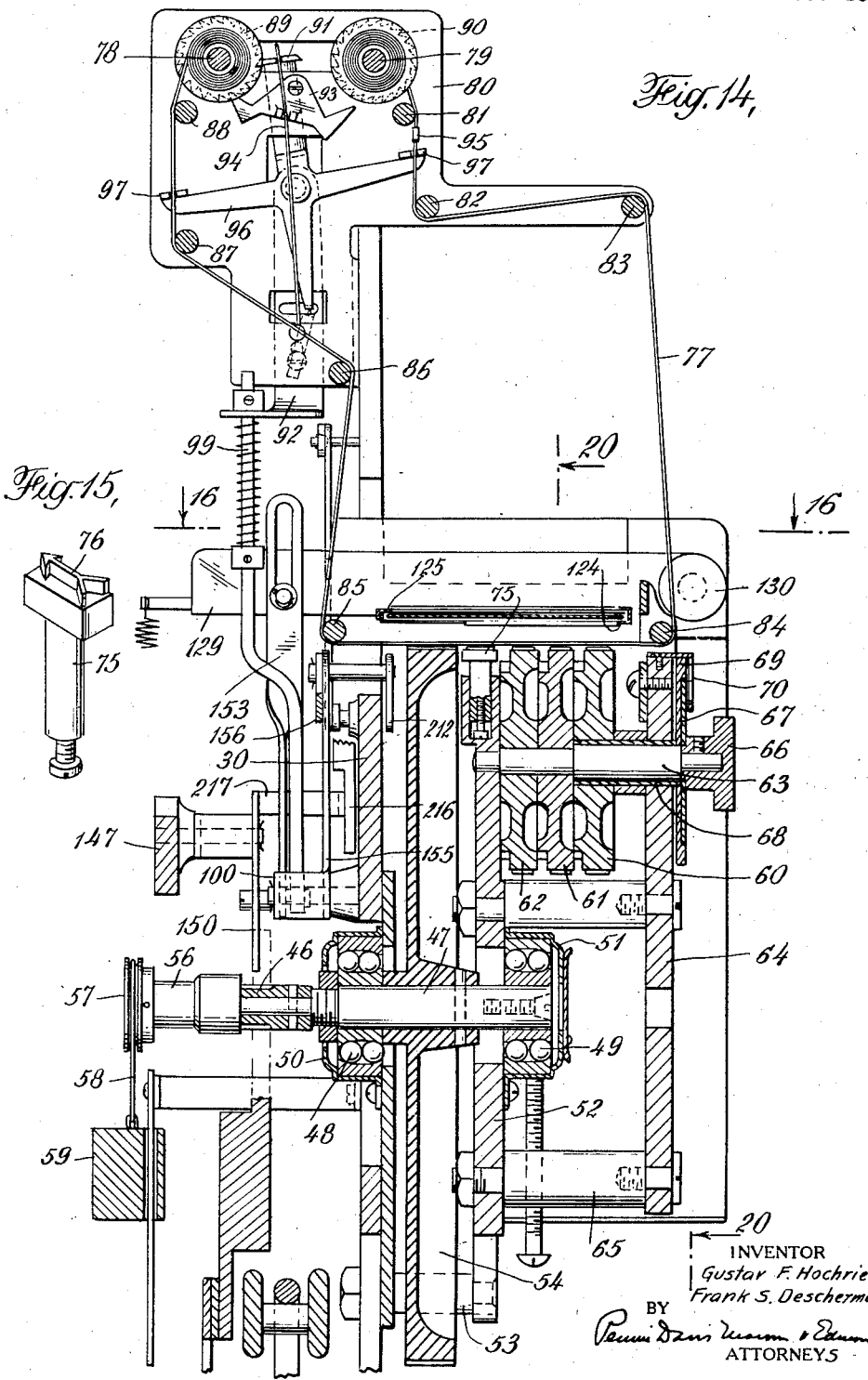

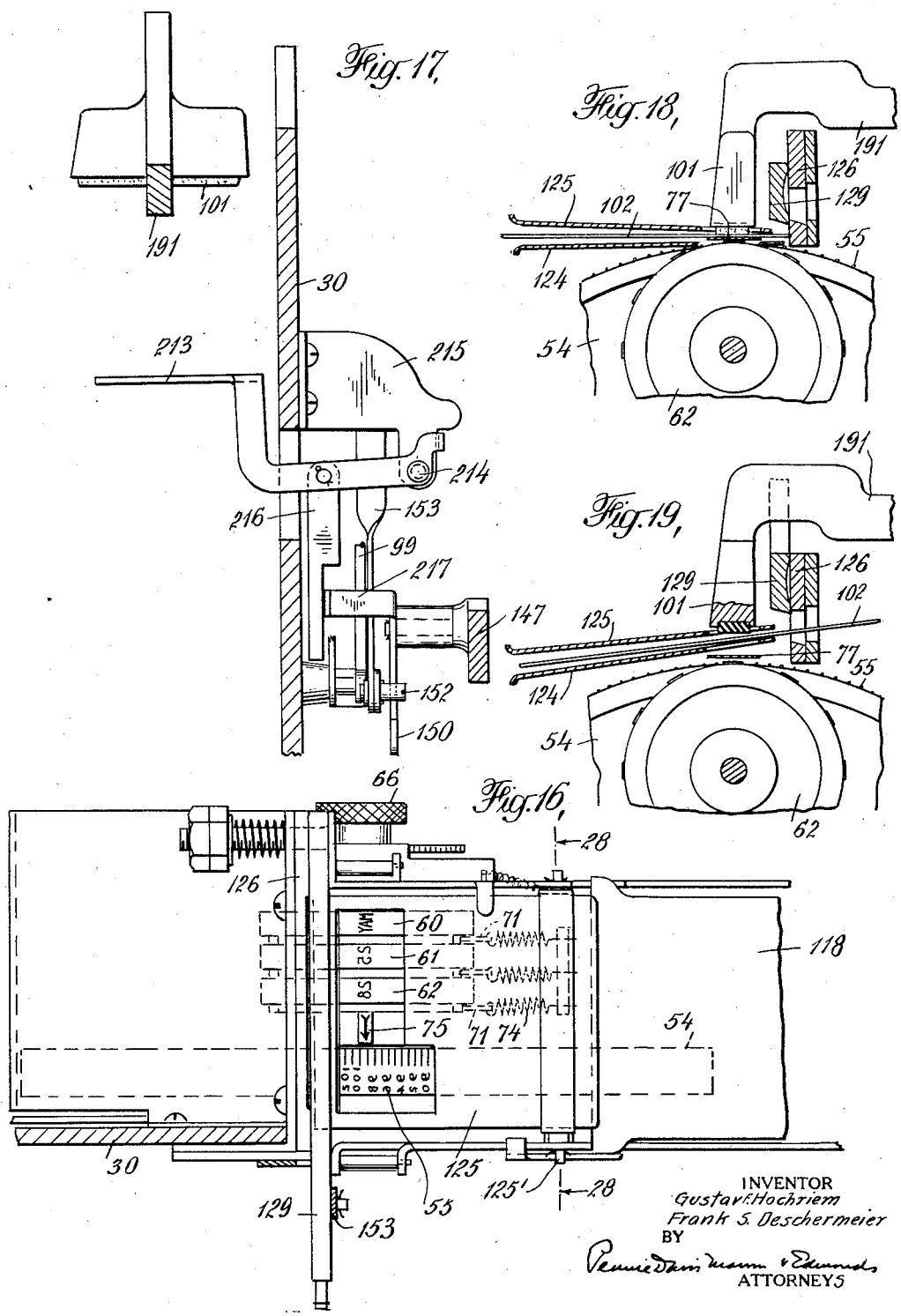

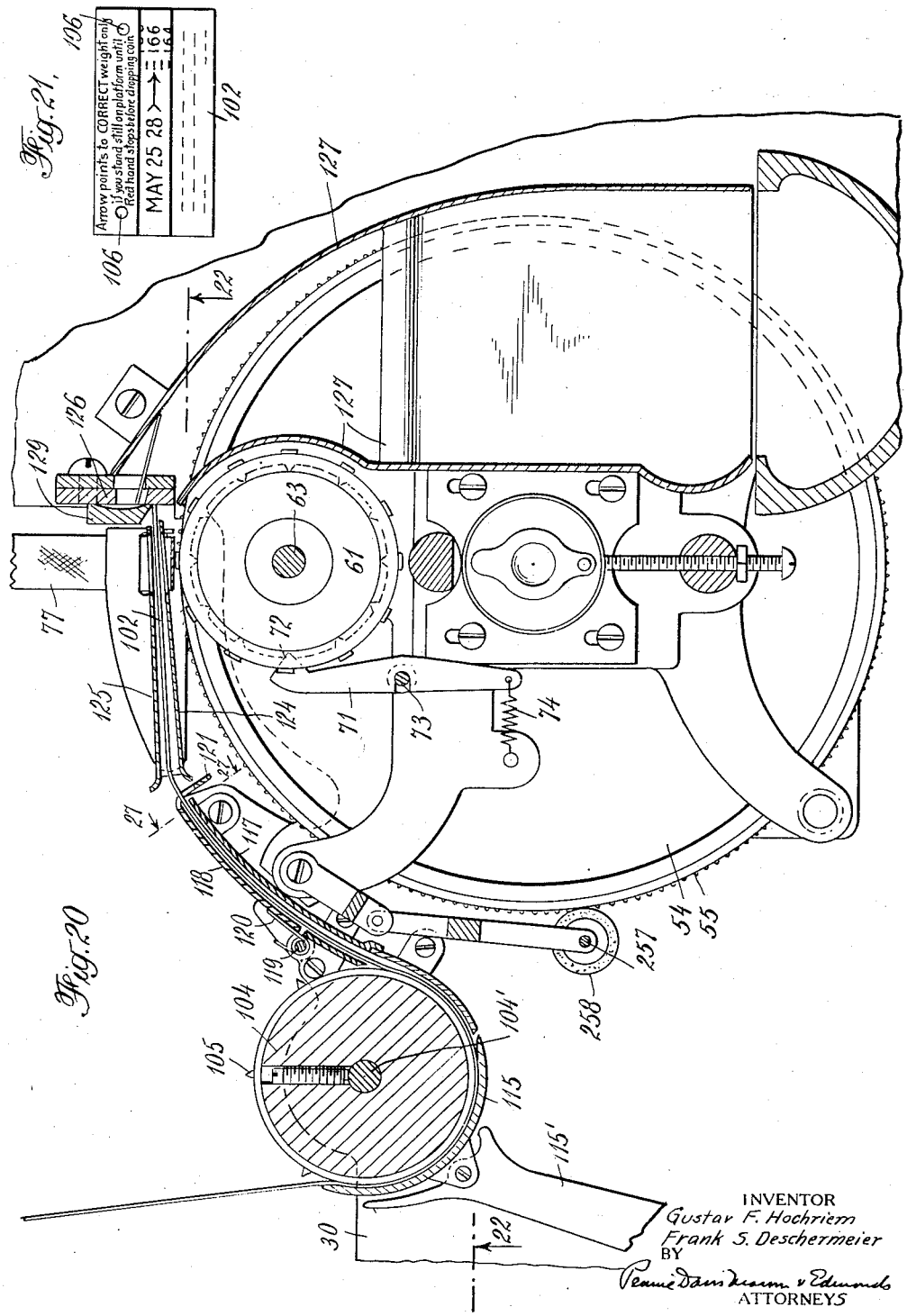

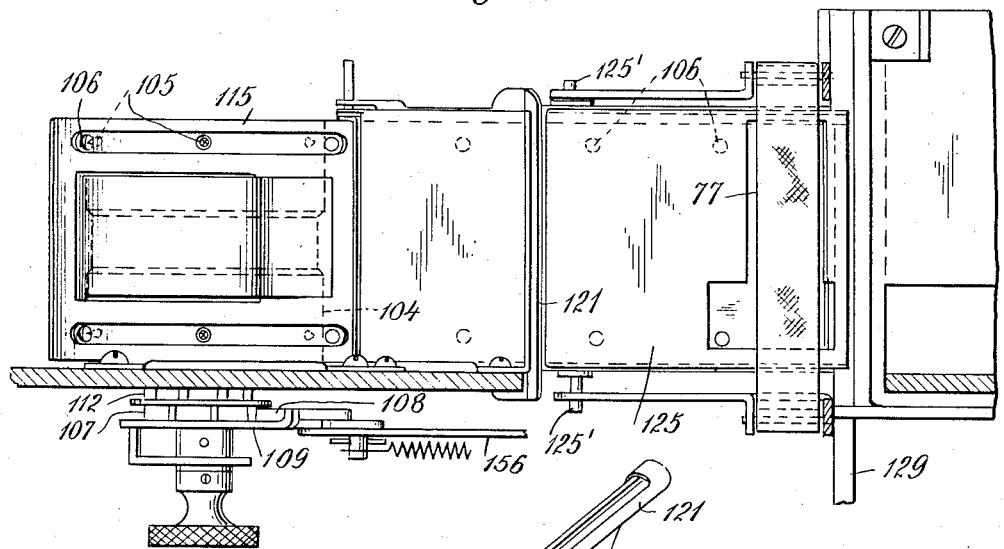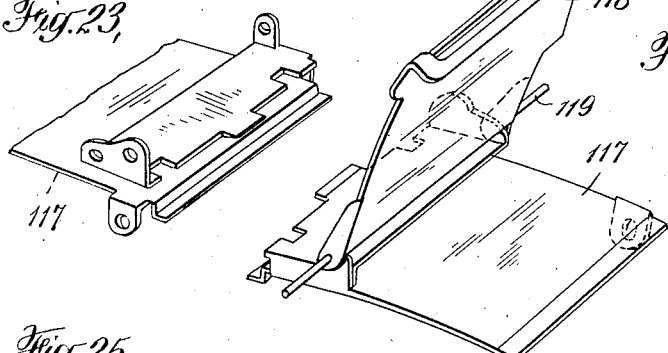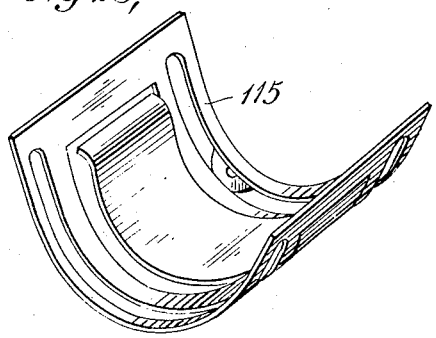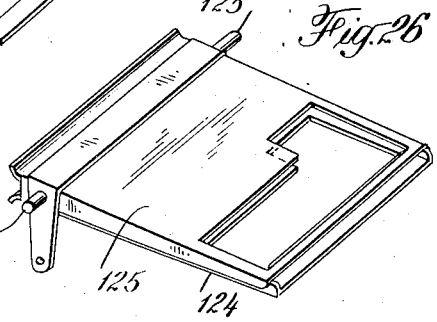

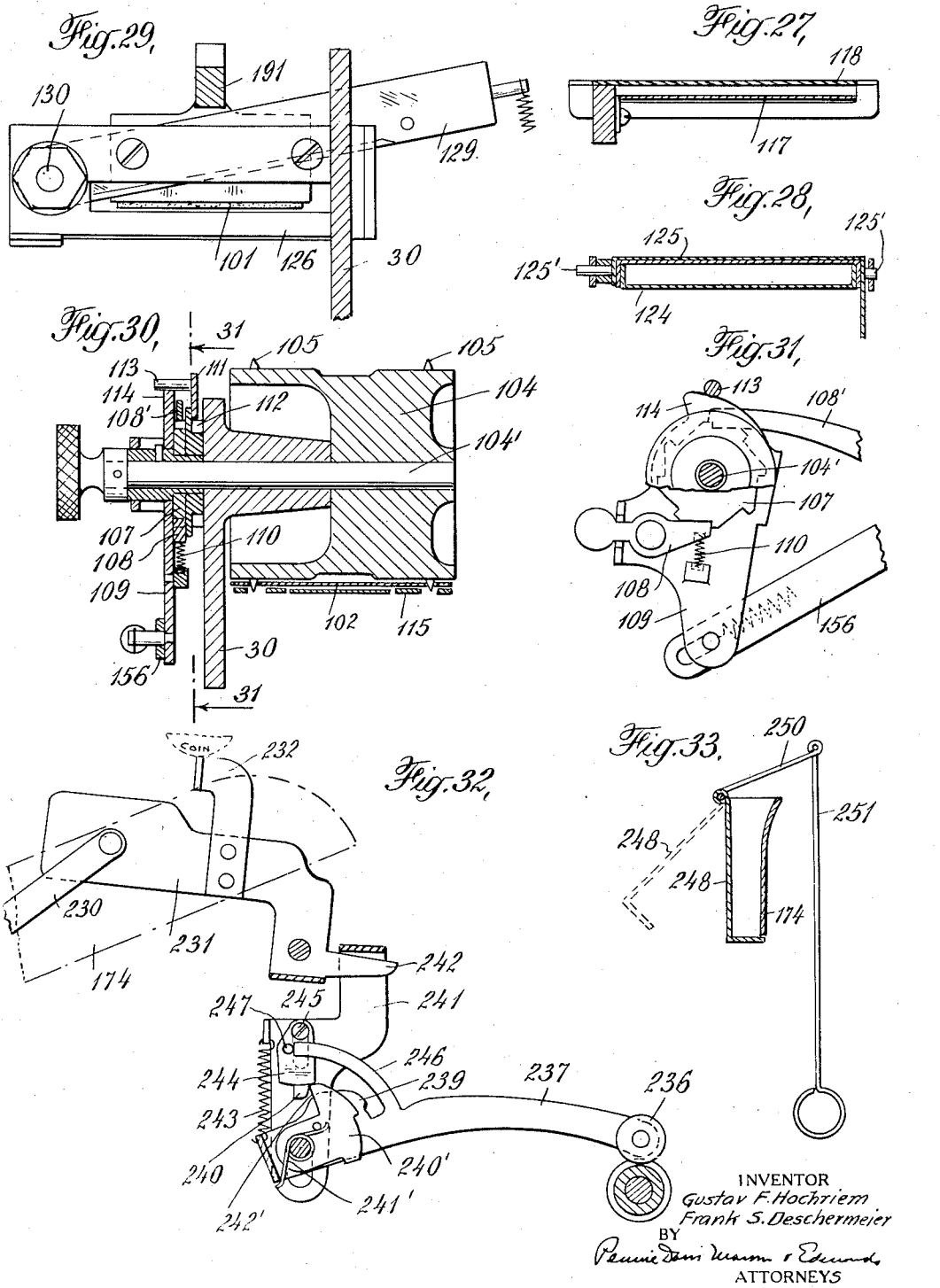

Patented Mar. 17, 1931

1,796,370

UNITED STATES PATENT OFFICE

GUSTAV F. HOCHRIEM AND FRANK S. DESCHERMEIER, OF CHICAGO, ILLINOIS, ASSIGNORS TO RHODES-HOCHRIEM MANUFACTURING COMPANY, OF CHICAGO, ILLINOIS, A CORPORATION OF ILLINOIS

WEIGHING MACHINE

Application filed June 26, 1928. Serial No. 288,324.

This invention relates to weighing and ticket-printing machines and has for its object the improvement of such machines. More particularly, the invention contemplates an improved weighing and ticket-printing machine which is controlled automatically by the insertion of a coin to print and eject a ticket showing the weight of the person standing on the platform of the machine.

In weighing and ticket-printing machines heretofore used, a magazine of separate blank tickets, usually of cardboard, is provided, and the tickets are fed into printing position, printed and ejected one by one as the persons to be weighed step upon the platform and insert a coin in the machine. Another type of weighing machine is provided with a rolled strip of tickets, but the feeding and cutting of the tickets is effected by a manually controlled lever.

The improved weighing and ticket-printing machine comprises in general a weighing mechanism, a printing mechanism including a type wheel, a platen or hammer and ribbon-feeding mechanism, and ticket-cutting mechanism. A continuous strip of tickets is provided, and the ticket-feeding mechanism advances the tickets one by one to printing position, in which they receive an impression from the type wheel, and are then cut from the strip and ejected, the several operations being effected automatically and successively when a person stands upon the platform and inserts a coin in the coin chute. The machine includes also means for locking the coin chute during certain phases of the operation.

The general operation of the machine comprises the following steps, operating in appropriate succession. The weight of the person standing on the platform initially raises a counter-weight which upon descending after the previous use of the machine has lifted the actuating weight for the mechanism. The actuating weight is thus freed from constraint of the counter-weight. At the same time, the ticket-feeding and ribbon-feeding mechanisms are set for operation at the proper interval, and the cutting knife is raised.

The weight of the person standing on the platform causes the type wheel to rotate until the figure indicating the weight is disposed beneath the platen or hammer. If a coin is now introduced to the coin chute, the release mechanism is tripped to first release the platen or hammer, thus causing the impression to be made through the ribbon on the ticket. Thereafter the actuating weight is released and in descending lifts the hammer and actuates the ticket-feeding and ribbon-feeding mechanisms. The strip of tickets is thus advanced to bring a fresh ticket into position above the type wheel while the printed ticket projects over a delivery chute. Thereupon the cutting knife is caused to descend and to cut the ticket from the strip so that it will fall through the chute. When the person steps from the platform the counter-weight descends, thus lifting the actuating weight to place the machine again in position for successive operation.

The foregoing and other improved features of the machine and of the invention will be better understood from the following description taken in conjunction with the accompanying drawings, in which Fig. 1 is a vertical section through the machine, Fig. 2 is a section on the line 2—2 of Figs. 1 and 3, Fig. 3 is a section on the line 3—3 of Fig. 1, Fig. 4 is an enlarged elevation of the housing which encloses the printing mechanism, Fig. 5 is an enlarged section on the line 5—5 of Fig. 1, Fig. 6 is a similar section on the line 6—6 of Fig. 1, Fig. 7 is a section similar to Fig. 6 with some of the mechanism removed for the purpose of clearer illustration, Fig. 8 is a section similar to Fig. 6 likewise with some of the mechanism removed, Figs. 9 and 10 are fragmentary sections illustrating the coin chute locking mechanism, Fig. 11 is a section similar to Fig. 6 illustrating a different position of the operating parts, Fig. 12 is a section similar to Fig. 11 with some of the mechanism removed and illustrating another position of the operating parts, Fig. 13 is a section similar to Fig. 12 illustrating another position of the operating parts, Fig. 14 is an enlarged section through the printing and ribbon-feeding mechanism, Fig. 15 is a detail in perspective of one of the elements of the printing mechanism.

Fig. 16 is a section on the line 16—16 of Fig. 14,

Fig. 17 is a detail in section of a latch releasing mechanism controlled by the platen or hammer, Figs. 18 and 19 are details in section of the printing and ticket-cutting mechanisms.

Fig. 20 is a section on the line 20—20 of Fig. 14,

Fig. 21 is a plan view of a single ticket printed and cut from the strip,

Fig. 22 is a section on the line 22—22 of Fig. 20,

Figure 7:
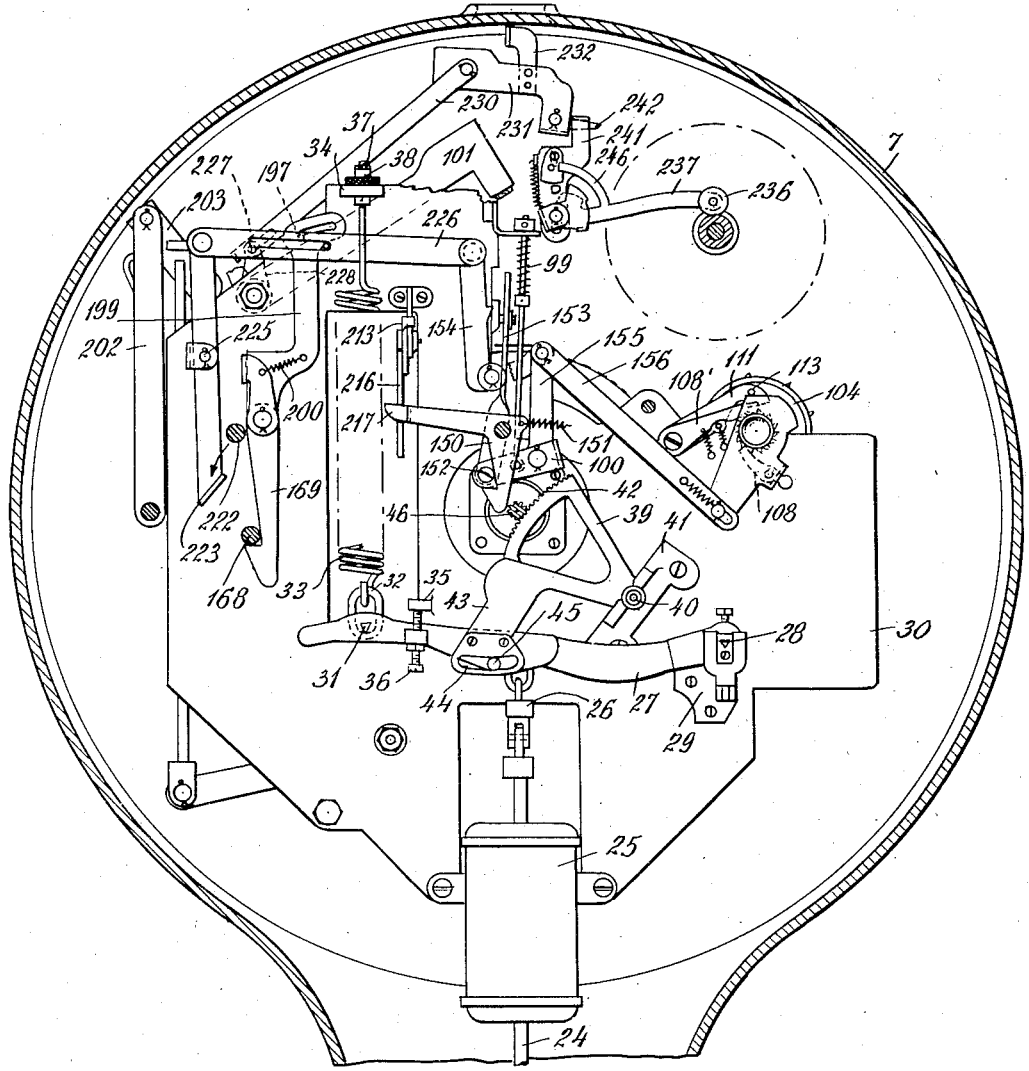

Figs. 23 to 26 inclusive are details in perspective of the ticket guide,

Fig. 27 is a section on the line 27—27 of Fig. 16,

Fig. 28 is a section on the line 28—28 of Fig. 16,

Fig. 29 is a detail in section of the ticket-cutting mechanism,

Fig. 30 is a detail in section of the ticket-feeding mechanism,

Fig. 31 is a section on the line 31—31 of Fig. 30,

Fig. 32 is a detail in section of a portion of the coin chute locking mechanism, and Fig. 33 is a detail in section of a device for evacuating the coin chute.

The general features of the weighing mechanism will be first described. Referring to Figs. 1 to 3 of the drawings, the machine comprises a base 5 with a hollow pedestal 6 and a housing 7 in which the mechanism is supported. A platform 8, upon which the person to be weighed stands, is provided with depending legs 9 which rest upon collars 10, having pins 11 which co-operate with the forked ends 12 of the legs. The collars rest upon knife edges 13 supported in the levers 15 and 16. The latter are provided with knife edges 17 and 18 resting in hangers 19 and 20 and are connected beneath the center of the platform by a hanger 21 co-operating with knife edges 22 and 23 on the respective levers.

The system of levers 15 and 16 with their supports and connections affords equalization of the weight resting on the platform 8, and the weight is transmitted through the lever 16 to a rod 24 which extends upwardly through the pedestal 6, as shown more clearly in Fig. 7. The rod extends through a dashpot 25 of usual type having a piston (not shown) with a restricted opening therein which permits a heavy oil contained in the dashpot to flow past the piston, thus avoiding the transmission of shocks to the weighing mechanism. The upper end of the rod 24 is connected by a link 26 to a lever 27 which is pivoted at 28 on a bracket 29, mounted on a plate 30 which is firmly secured within the housing 7. The opposite end of the lever 27 is connected through a knife edge 31 and link 32 to a spring 33 which is supported from a bracket 34 on the plate 30. The upward movement of the lever 27 is limited by a stop 35 which is engaged by an adjustable screw 36 on the lever. A screw 37 and knurled head 38 permit adjustment of the tension of the spring so that the weight of the person standing on the scale platform is properly indicated as hereinafter described.

A sector 39 is pivoted at 40 on a bracket 41 secured to the plate 30 and is provided with gear teeth 42. An arm 43 on the sector is slotted at 44 to receive a pin 45 on the lever 27. When the lever is depressed by a weight acting through a rod 24, the sector is moved from its initial position.

The teeth on the sector 39 engage a pinion 46 secured to a shaft 47 (Fig. 14) which is supported for rotation in ball bearings 48 and 49. The latter are mounted in bearing cups 50 and 51 secured to the plate 30 and to a plate 52 which is mounted in spaced relation to the plate 30 on legs 53. The shaft 47 supports a type wheel 54 which is adapted to be rotated therewith and carries on its periphery a succession of type faces 55 (Fig. 16) indicative of the weight to be recorded. The shaft 47 carries a collar 56 with a pulley 57 thereon. A cord 58 is secured to and disposed about the pulley and supports a weight 59 which takes up the back-lash between the teeth 42 on the sector 39 and the teeth on the pinion 46, thus assuring accuracy of movement of the type wheel 54 under the actuation of the weighing mechanism.

To effect the simultaneous printing of the date upon the ticket the machine is provided with type wheels 60, 61 and 62 carrying on their peripheries type faces indicative of months, days and years (Fig. 16). These type wheels are mounted on a spindle 63 which is supported in the plate 52 and in a plate 64 secured in spaced relation to the plate 52 by legs 65. The spindle 63 carries a knurled knob 66 at the outer end thereof where it is accessible at the face of the machine. The type wheel 61 is secured to the spindle and may be rotated by turning the knob 66. A disc 67 also secured to the spindle 63 carries members corresponding to the type faces on the type wheel 61 and gives visual indication of the position of the type faces. The type wheel 60 is secured to a sleeve 68 mounted on the spindle 63 and having a flange 69 which bears indications of the type faces on the type wheel, thus also giving visual indication of the position of these type faces.

A gauge 70 (Fig. 5) has an opening therein with which the figures on the disc 67 and flange 69 register to indicate the type faces which are in printing position. The type wheel 62 bearing type faces indicating the years is loosely mounted on the spindle 63 and may be rotated manually to bring the proper type face into printing position. The several type wheels are held in adjusted position by pawls 71 (Figs. 16 and 20) which engage notches 72 in the several type wheels. The pawls 71 are pivoted at 73 and are normally held in engagement with the type wheels by springs 74. The pawls permit manual rotation of the several type wheels but hold them, nevertheless, firmly in adjusted position during the printing operation. A type element 75 (Figs. 14 and 15) is adjustably supported in the plate 52 between the type wheel 54 and the type wheel 62, and carries a type face such as an arrow 76, which points to the weight of the individual standing on the platform when the printing operation is completed.

The printing is effected through a ribbon 77 which is disposed about spindles 78 and 79 mounted for rotation on a plate 80 which is secured to the plate 30. The ribbon is threaded over guide rolls 81, 82, 83, 84, 85, 86, 87, and 88, appropriately disposed to cause the ribbon to pass over the peripheries of the type wheels 54, 60, 61, and 62. The ribbon is actuated by a ratchet mechanism to advance after each printing operation. The mechanism includes ratchet wheels 89 and 90 secured to the spindles 78 and 79, and a pawl 91 pivoted on a sliding bar 92 and adapted to co-operate with either of the ratchet wheels 89 or 90, thus permitting a reversal of the movement of the ribbon.

A stop pawl 93 is pivotally mounted on the plate 80 for engagement with the ratchet wheels 89 and 90 to hold the same firmly after the ribbon has been advanced. A spring 94 secured to the plate 80 engages the pawl 91 and the stop pawl 93 to hold them in proper co-operative relation with either of the ratchet wheels 89 and 90. The reversal of the ribbon-moving mechanism is accomplished by engagement of abutments 95 secured to the ribbon near the ends thereof with arms 96 connected to the pawl 91. These arms are provided with flanges 97 with openings therein through which the ribbon passes. When the ribbon has been moved in one direction to substantially exhaust the supply of ribbon on either of the spindles, one of the abutments 95 causes the pawl 91 to swing, for example from the position indicated in Fig. 14, to the opposite position in engagement with the ratchet 90 whereupon the ribbon is rewound on the spindle 79. The ribbon-feeding mechanism is actuated through the bar 92 slidably mounted on the plate 80 and connected by a rod 99 to a lever 100 (Fig. 6) pivoted on the plate 30 and adapted to be actuated in the manner hereinafter described to reciprocate the bar 92.

The printing is effected by a platen or hammer 101 (Fig. 5) pivoted on the plate 30 and normally held in elevated position by mechanism hereinafter described. When the hammer is released it descends under its own weight and strikes the ticket 102 (Figs. 18, 19 and 21) disposed above the ribbon 77 and over the several type wheels. The impact of the hammer causes an impression on the ticket as indicated in Fig. 21, that is to say, the date and the weight of the individual standing on the platform are transferred to the ticket.

The tickets are disposed preferably in the form of a roll 103 (Figs. 5 and 6) and are delivered therefrom to a feeding roll 104 (Fig. 20) mounted on a shaft 104' which is supported on the plate 30. The roll is provided with teeth 105 which are adapted to engage in openings 106 (Fig. 21) in the individual tickets. The feeding roll 104 is actuated through a ratchet 107 (Figs. 30 and 31) secured to the shaft 104' and a co-operating pawl 108, the latter being supported on a swinging plate 109 and normally held in engagement with the ratchet by a spring 110. The plate 109 is actuated through a mechanism hereinafter described to rotate the feeding roll 104 and thus advance the strip of tickets. The feeding roll is normally locked by a pawl 111 (Fig. 6) which engages the teeth of a ratchet 112 secured to the shaft 104'. A pin 113 on the pawl 111 is disposed in the path of a cam surface 114 on the plate 109. Thus as the pawl 108 is retracted preparatory to the forward movement of the feeding roll, the pawl 111 is withdrawn and is held from engagement with the ratchet 112 until the forward movement is completed, when it again engages the ratchet to prevent movement thereof until the machine is again actuated. A pawl 108' engages the ratchet 107 to prevent reversed movement thereof when the pawl 108 is retracted.

The ticket strip is held frictionally in engagement with the feed roll 104 by a guide plate 115 which is pivotally connected to an arm 115' (Fig. 5) supported to swing on the plate 30. A spring 116 braces the arm 115' toward the roll 104, and passes thence between guide plates 117 and 118, the former being fixedly secured to the plate 30 while the latter is pivoted at 119 and is normally held in the position indicated in Fig. 20 by a spring 120. A depending arm 121 on the plate 118 is slotted to permit the ticket strip to pass therethrough. The plate 118 rests normally in the position indicated in Fig. 20 but is lifted slightly before the printing is effected to take up any slackness in the strip, thus avoiding buckling of the paper above the type wheels. The movement of the plate 118 is effected by an arm 122 (Fig. 6) having a corresponding arm 123 which is disposed in the path of a pivoted arm forming a part of the actuating mechanism hereinafter described.

The end of the ticket strip is disposed between guide plates 124 and 125 pivoted at 125' (Fig. 5) and held normally in raised position by a spring 126' to prevent contact with the type wheels. The plates 124 and 125 have suitable apertures to permit contact of the hammer with the ticket and to force the same into contact with the ribbon overlying the type wheels for the purpose of making an impression.

The feed roll 104 is not actuated to advance the ticket strip until after an impression has been made. Thereupon the strip advances a distance equal to the width of a single ticket, the last ticket which has received an impression being projected through a plate 126 (Figs. 20 and 29) mounted on the plate 30 and into a chute formed by a plate 127 which terminates in a cup 128 on the face of the machine (Fig. 4). The ticket is severed from the strip by a knife 129 which is elevated prior to the printing operation and is caused to descend at the proper interval. The knife is pivoted at 130 and is adapted to be raised and released by mechanism hereinafter described.

To permit the actuation of the various mechanisms in proper sequence, the system of levers 15 and 16 (Figs. 1 to 3) is supported through the hangers 19 and 20 upon bell crank levers 131 and 132 which are pivoted on lugs 133 and 134 in the base of the machine. The bell crank levers are connected by rods 135 to operate in unison, and the movement thereof is limited by adjustable screws 136 and 137 which engage with the base of the machine and with stops 138 provided for that purpose. A counter-weight 139 is adjustably supported on rods 140 which are connected to the bell crank levers 131 and this counter-weight is lifted, therefore, when the person to be weighed steps upon the platform 8 and before the system of levers 15 and 16 actuates the weighing mechanism. A bell crank lever 141 is connected by a link 142 to a rod 143 which connects the bell crank levers 131. A rod 144 is connected to one arm of the bell crank lever 141 and is lifted when the counter-weight 139 rises. The rod 144 extends upwardly through the pedestal of the machine and is connected by an offset bracket 145 (Fig. 6) to a rod 146. The latter is pivotally connected at its upper end to a lever 147 which is mounted on the plate 30. The free end of the lever carries a plunger 148 which is disposed in a dashpot 149, the purpose of which is to avoid the effect of shocks upon the mechanism.

The lever 147 carries a latch 150 which is normally held by a spring 151 in position to engage a pin 152 on the lever 100 hereinbefore described. Upon the upward movement of the lever 147 the lever 100 is actuated and thereby lifts the rod 99 to set the ribbon-feeding mechanism. An arm 153 pivotally connected to the lever 100 is raised at the same time to lift the knife 129 until the latter is engaged by a pivoted latch 154 which retains the knife in its elevated position. Simultaneously an arm 155 of the lever 100 actuates a link 156 which is connected to the arm 109 of the ticket-feeding mechanism to retract the arm and set it in position to feed the ticket strip at the proper interval. During its swinging movement the arm 155 engages the arm 123 to lift the guide plate 118 as hereinbefore described. At the end of the upward movement of the rod 146 a dog 157 thereon engages a latch 158 pivoted at 159 on the plate 30 and connected to an arm 160 by a pin and slot connection 161 and a spring 162. The rod 146 is thus held at the uppermost limit of its travel until the machine has been actuated to print and discharge a ticket. It is released as hereinafter described.

The actuating weight 163 is supported on a pivoted arm 164 which is mounted on the plate 30. It is connected by a link 165 to the arm 147 through a pin 166 and slot 167. Thus upon the downward movement of the rod 146 when it is released from the latch 158 the weight 163 is elevated. In that position it is held by engagement of a pin 168 with a latch 169 pivoted at 170 on the plate 30. When the weight 163 is released as hereinafter described, a pin 171 operating in a cam slot 172 in the arm 160 causes the latter to retract the latch 158 thus releasing the rod 146 which is permitted to descend, therefore, when the person standing on the platform steps therefrom.

The release of the weight 163 and of the various operating mechanisms is effected through the introduction of a coin at the coin slot 173 (Fig. 5), to a coin chute 174 which extends along the wall of the housing toward the pedestal. A coin trip lever 175 is pivoted at 176 on the plate 30 and has a tail 177 disposed in a slot 178 in the coin chute. Thus the coin descending through the chute comes to rest on the tail of the lever 175. The lever is balanced by a counter-weight 179 and tilts accordingly when the coin engages the tail of the lever. A finger 180 thereon engages a latch 181 pivoted at 182 on the plate 30 which is adapted to be engaged by and to hold a coin-release lever 183 pivoted at 184 on the plate 30 against the tension of a spring 185. A rod 186 is pivotally connected to the end of the lever 183 and extends upwardly to a point adjacent the end of a latch 187 which is pivoted at 188 on the plate 30 and is adapted to be engaged by a pin 189 on the end 190 of an arm 191 carrying the hammer or platen 101. The hammer is thus released and is permitted to descend to effect the printing operation.

Figure 8:
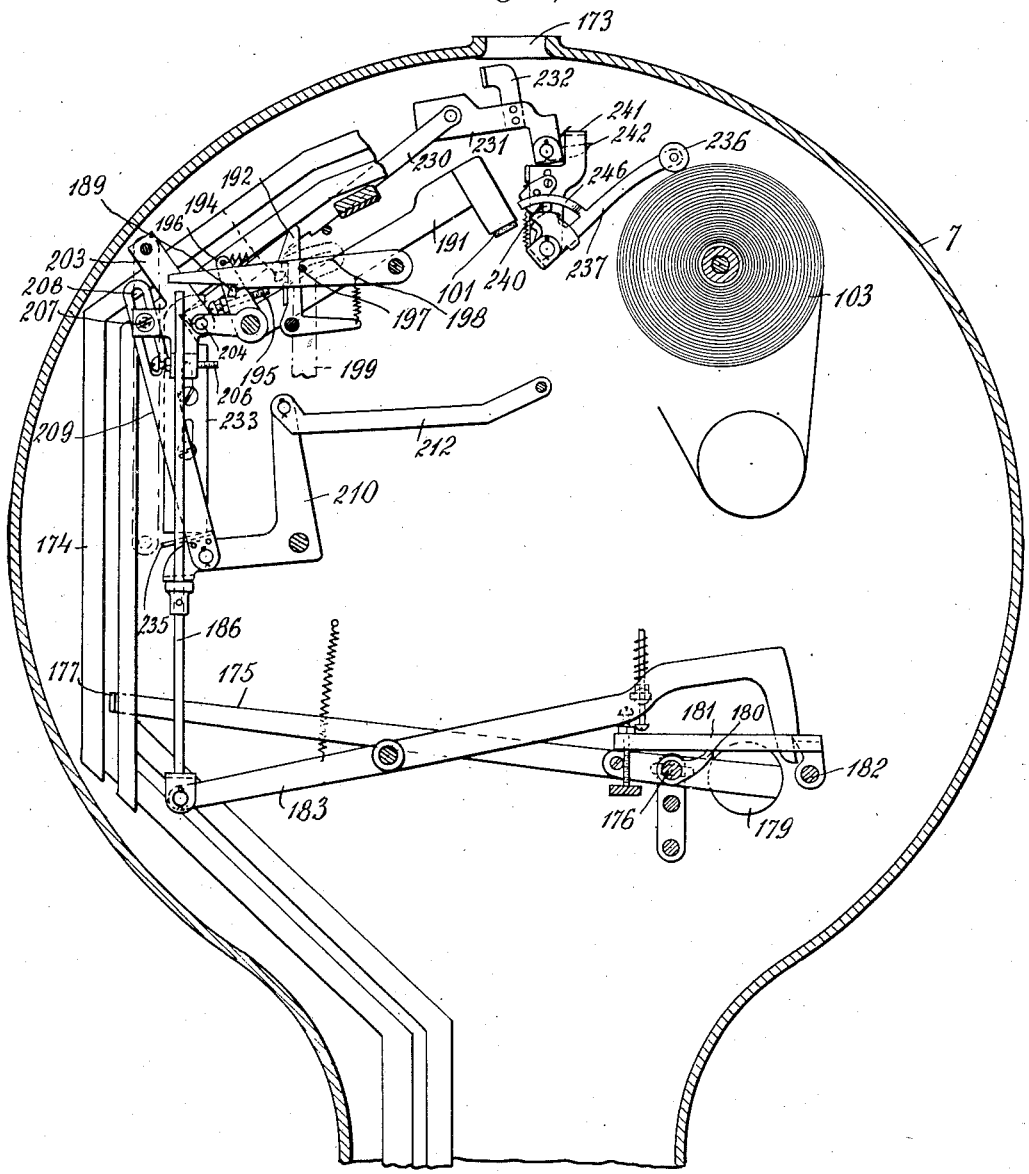

The upward movement of the rod 186 and of the latch 187 is retarded temporarily after the initial release of the hammer by a dog 192 pivoted at 193 on the plate 30 and engaging a pin 194 on the latch. As the hammer descends a screw 195 adjustably supported in an arm 196 connected to the arm 191 engages the dog 192 and releases the latch 187. The further upward movement of the rod 186 under the actuation of the spring 185 carries the latch 187 upwardly. A pin 197 (Fig. 8) on the latch is disposed in a slot 198 at the end of an arm 199 pivoted at 170 and connected to the latch 169 by a spring 200. The movement of the pin 197 swings the arm 199 toward the left viewing Fig. 6 and thus releases the pin 168 from the latch 169 as indicated in Fig. 12.

The weight 163 is connected through a pin 201 (Fig. 12) and link 202 to a lever 203 which is pivotally connected at 204 to an arm 205 which is connected to the hammer 101. A screw 206 in the lever 203 is adapted to engage the hammer adjacent the fulcrum point thereon so that the descent of the weight raises the hammer from printing position until the pin 189 is again secured by the latch 187. Simultaneously a pin 207 in an arm of the lever 203 engages the end of a slot 208 in a link 209 which is connected to a bell crank lever 210 pivotally mounted on the plate 30. One arm of the bell crank lever 210 is adapted to engage an abutment 211 on the rod 186 (Fig. 13) and to move the rod downwardly against the tension of the spring 185 until the arm 183 is again engaged by the latch 181 and thus restored to its normal position. The other arm of the bell crank lever 210 is connected by a link 212 to the arm 155 of the lever 100, which is connected to the rod 99 and to the link 156 as hereinbefore described.

Upon the descent of the hammer 101 and before the weight 163 is released, the hammer engages an arm 213 (Fig. 17) pivoted at 214 on the bracket 215 which is secured to the plate 30. A finger 216 depends from the lever 213 and is adapted to engage an arm 217 on the latch 150 (Figs. 11 and 12) thus moving the latch away from the pin 152 so that upon the movement of the bell crank lever 210 as hereinbefore described the rod 99 and link 156 are actuated simultaneously to feed the ribbon and to advance the ticket strip so that the printed ticket is displaced from printing position in readiness for the cutting operation. At the same time the plate 153 which lifts the knife 129 is withdrawn, leaving the knife supported by the latch 154.

Meanwhile, during the descent of the weight 163 a pin 218 secured thereto engages a cam-shaped arm 219 pivotally secured at 220 to the plate 30. The other end of the arm 219 is connected by a spring 221 to the knife 129 so that the spring is tensioned by the descent of the weight. When the weight approaches its lowermost position, a pin 222 thereon engages a cam surface 223 on a lever 224 pivoted at 225 on the plate 30 and connected by a link 226 to the latch 154. The knife is thus released from the latch and descends under the tension of the spring 221 to sever the printed ticket from the strip. The printed ticket is discharged from the machine as hereinbefore described. The function of the machine being thus accomplished, the person being weighed steps from the platform and, the dog 157 having been released from the latch 158 as hereinbefore described, the rod 146 descends and the weight 163 is again raised through link 165 and pin 166 and is latched again in its raised position as indicated in Fig. 6.

Figure 9:
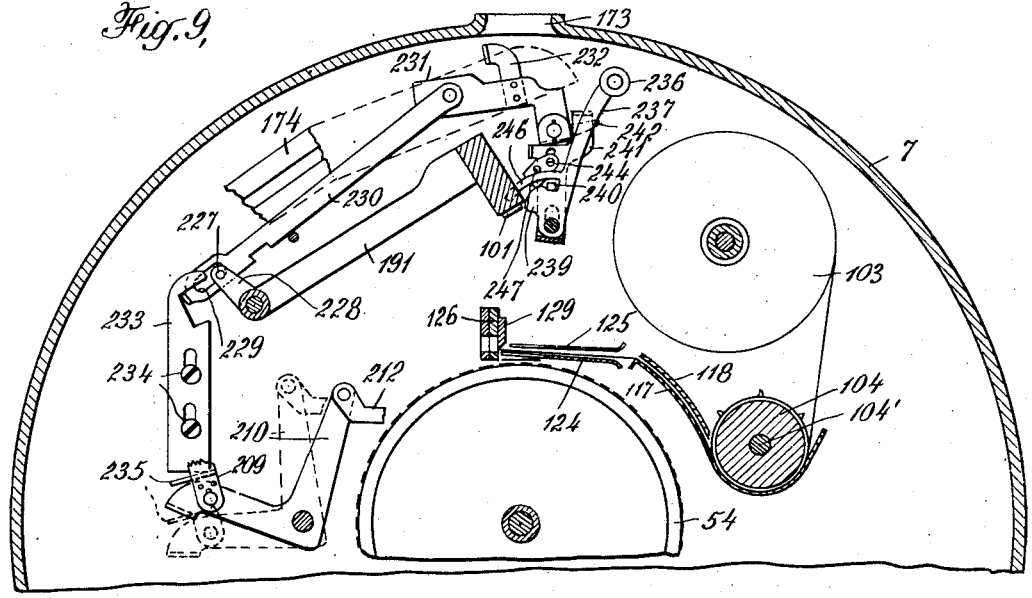
Figure 10:
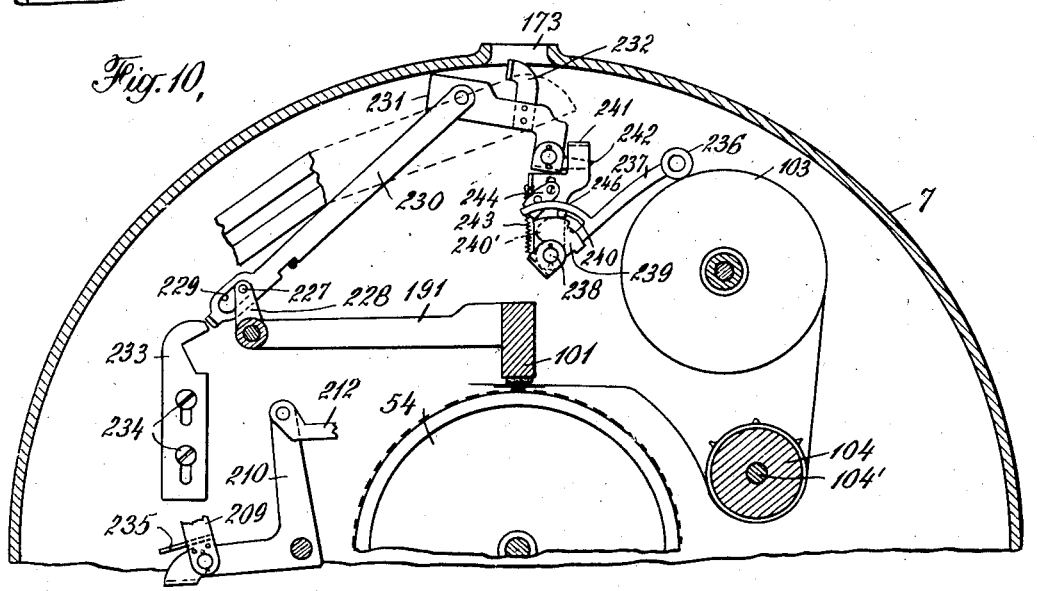

Under certain circumstances, as for example when the hammer is lower to printing position or when the roll of tickets is exhausted, it is undesirable to permit the introduction of a coin to the machine. Consequently provision is made to lock the coin slot under such conditions. To accomplish this object a pin 227 (Figs. 9 and 10) is disposed at the end of an arm 228 of the hammer and is adapted to operate in a slot 229 of the link 230 which is connected to a lever 231 pivotally secured adjacent the coin slot. An arm 232 on the lever is adapted to be moved thereby into position to prevent the introduction of the coin. When the hammer is in raised position the arm 232 does not obstruct the slot. As soon as the hammer starts to descend the link 230 is actuated to swing the lever and to move the arm 232 into the position indicated in Fig. 10, thus blocking the coin slot and preventing the introduction of a coin to the chute until the hammer is again raised. In the position indicated in Fig. 10 the link 230 is locked by a plate 233 which is slidably mounted on screws 234. The lower end of the plate 233 is adapted to be engaged by an abutment 235 connected to the bell crank lever 210, so that as the weight 163 descends to raise the hammer the plate 233 is lifted to clear the end of the link 230, thus permitting the movement of the hammer to retract the arm 232, leaving the coin slot open for the successive operation.

A follower 236 for the ticket roll is mounted on the arm 237 pivoted at 238. A cam 239 is actuated by the movement of the lever 237. The cam engages a pin 240 on a sliding plate 241 which is adapted to engage a projection 242 on the lever 231. A second cam 240' is adapted to follow the cam 239 under the actuation of a spring 241' and is provided with a sharp abutment 242'. Thus when the arm 237 is lifted the cam 239 raises the pin 240 and the cam 240' rides under it. When the roll of tickets is exhausted the pin 240 rides off the abutment 242' and the lever 231 is actuated to move the arm 232 beneath the coin slot, thus preventing the introduction of additional coins thereto. When the plate 241 is moved downwardly under the actuation of the spring 243 to actuate the lever 231, it is locked by a pawl 244 pivotally mounted at 245 on the plate and adapted to engage the cam 239. It is thereafter impossible to insert a coin in the machine until a new roll of tickets has been introduced to raise the follower 236. When the tickets are introduced, an arm 246 engages a pin 247 on the pawl 244 and moves it out of engagement with the cam 239, thus permitting the arm 237 to swing upwardly. The plate 241 is raised simultaneously and the lever 231 is actuated to move the arm 232 out of the path of the coin. When the ticket strip has been threaded through the guide plates and the end is disposed in printing position, the machine is again ready for operation in the manner hereinbefore described.

It sometimes happens that foreign matter such as paper is forced through the coin slot and clogs the chute. To relieve the machine of such obstructions the chute is provided with a pivoted wall 248 (Figs. 6 and 33) which is normally held in closed position by a spring 249. The wall 248 is connected by a link 250 to a depending arm 251 disposed at the face of the machine (Fig. 5) where it is readily accessible. If the coin chute is thus clogged, the attendant pulls downwardly on the arm 251, thus moving the wall 248 outwardly as indicated in dotted lines in Fig. 33. The obstructing material drops from the chute which is thus cleared for further use.

The type wheel 54, being mounted in ball bearings oscillates readily and in order that the weight of the person using the scale may be recorded accurately a dial 252 is provided at the face of the machine (Figs. 1, 4 and 5) and a pointer 253 is supported on a shaft 254 extending through the dial and carrying a gear 255. The gear meshes with a pinion 256 on a shaft 257 carrying a friction wheel 258 which engages the type wheel 54. The pointer 253 oscillates, therefore, with the type wheel and should be permitted to come to rest before the coin is inserted in the machine.

The housing 7 is closed at the front by a cover 259 (Fig. 4) supported on a hinge 260 and having preferably a glassed front 261 through which the operation of the mechanism may be observed. The cover may be provided with a lock 262 to avoid tampering with the mechanism. Similarly the back of the machine may be provided with a closure 263 which may be equipped with a lock 264 whereby it may be securely held and removed at will to permit access to the mechanism.

The coins deposited in the coin chute 174 may be directed thereby into any suitable receptacle in the pedestal 6 whence they may be withdrawn through an aperture provided for that purpose.

The apparatus as described affords a simple and convenient weighing machine which performs its functions automatically and without manual actuation other than by the insertion of the coin. The machine is particularly suitable for exposure in places where it may be utilized freely by the public. The mechanism is simple and effective and is capable of recording the weight of an individual and ejecting a ticket with the weight recorded thereon with the minimum of effort by the person using the scale. It provides, moreover, for the inclusion of a large number of tickets in compact form so that the machine does not require frequent attention. These and other advantages are attained through the provision of means for effecting the desired operations in the proper succession, and various changes may be made in the operating mechanism and in the sequence of movement thereof without departing from the invention or sacrificing any of its advantages.

I claim:

1. In a ticket-printing weight scale, the combination of weighing mechanism, gravity actuated ticket-printing mechanism associated therewith, mechanism for feeding a strip of tickets to advance the tickets successively to printing position, means for severing a ticket from the strip after the printing is effected, and coin-controlled means to release for successive operation the ticket-printing mechanism, the ticket-feeding mechanism and the ticket-severing means including means to normally hold the gravity-actuated ticket-printing mechanism in elevated position and adapted to be tripped by the coin-controlled means.

2. In a ticket-printing weight scale, the combination of weighing mechanism, ticket-printing mechanism associated therewith, mechanism for feeding a strip of tickets to advance the tickets successively to printing position, means for severing a ticket from the strip after the printing is effected, coin-controlled means to release for successive operation the ticket-printing mechanism, the ticket-feeding mechanism and the ticket-severing means, and means to prevent the introduction of a coin to the coin-controlled means after the printing operation is initiated.

3. In a ticket-printing weight scale, the combination of weighing mechanism, gravity actuated ticket-printing mechanism associated therewith, mechanism for feeding a strip of tickets to advance the tickets successively to printing position, means for severing a ticket from the strip after the printing is effected, coin-controlled means to release for successive operation the ticket-printing mechanism, the ticket-feeding mechanism and the ticket-severing means including means to normally hold the gravity-actuated ticket-printing mechanism in elevated position and adapted to be tripped by the coin-controlled means, and means to prevent the introduction of a coin to the coin-controlled means when the strip of tickets is exhausted.

4. In a ticket-printing weight scale, the combination of weighing mechanism, gravity actuated ticket-printing mechanism associated therewith, means for supporting a strip of tickets, mechanism for feeding the strip to advance the tickets successively to printing position, a cutting knife, and coin-controlled means to release for successive operation the ticket-printing mechanism, the ticket-feeding mechanism and the cutting knife including means to normally hold the gravity-actuated ticket-printing mechanism in elevated position and adapted to be tripped by the coin-controlled means.

5. In a ticket-printing weight scale, the combination of weighing mechanism, ticket-printing mechanism associated therewith, means supporting a strip of tickets, mechanism for feeding the strip to advance the tickets successively to printing position, a cutting knife, gravity means to supply power to the feeding mechanism and the cutting knife, and coin-controlled means to release for successive operation the printing and feeding mechanism and the cutting knife including means to normally hold the ticket-printing mechanism in elevated position and adapted to be tripped by the coin-controlled means.

6. In a ticket-printing weight scale, the combination of weighing mechanism, ticket-printing mechanism associated therewith, means supporting a strip of tickets, mechanism for feeding the strip to advance the tickets successively to printing position, a cutting knife, gravity means to supply power to the feeding mechanism and the cutting knife, coin-controlled means to release for successive operation the printing and feeding mechanism and the cutting knife including means to normally hold the ticket-printing mechanism in elevated position and adapted to be tripped by the coin-controlled means, and means for automatically restoring the gravity means.

7. In a ticket-printing weight scale, the combination of weighing mechanism, ticket-printing mechanism associated therewith including a rotatable type wheel and a pivoted hammer above the type wheel, means to hold the hammer in elevated position, mechanism for feeding a strip of tickets to advance the tickets successively to printing position beneath the hammer, means to sever the tickets from the strip, gravity means to actuate the ticket-feeding mechanism and severing means, means to restrain the gravity means, and coin-controlled means to release for successive operation the hammer, ticket-feeding mechanism and severing means including means released by the hammer to trip the gravity means.

8. In a ticket-printing weight scale, the combination of weighing mechanism, ticket-printing mechanism associated therewith including a rotatable type wheel and a pivoted hammer above the type wheel, means to hold the hammer in elevated position, mechanism for feeding a strip of tickets to advance the tickets successively to printing position beneath the hammer, means to sever the tickets from the strip, gravity means to actuate the ticket-feeding mechanism and severing means, means to restrain the gravity means, coin-controlled means to release for successive operation the hammer, ticket-feeding mechanism and severing means including means released by the hammer to trip the gravity means, and means to prevent the introduction of a coin to the coin-controlled means after the hammer is released.

9. In a ticket-printing weight scale, the combination of weighing mechanism, ticket-printing mechanism associated therewith including a rotatable type wheel and a pivoted hammer above the type wheel, means to hold the hammer in elevated position, mechanism for feeding a strip of tickets to advance the tickets successively to printing position beneath the hammer, means to sever the tickets from the strip, gravity means to actuate the ticket-feeding mechanism and severing means, means to restrain the gravity means, coin-controlled means to release for successive operation the hammer, ticket-feeding mechanism and severing means including means released by the hammer to trip the gravity means, and means to prevent the introduction of a coin to the coin-controlled means when the strip of tickets is exhausted.

10. In a ticket-printing weight scale, the combination of weighing mechanism, ticket-printing mechanism associated therewith including a rotatable type wheel and a gravity actuated hammer above the type wheel, means to hold the hammer in elevated position, mechanism for feeding a strip of tickets to advance the tickets successively to printing position beneath the hammer, means to sever the tickets from the strip, gravity means to actuate the ticket-feeding mechanism and severing means, means to restrain the gravity means, and coin-controlled means to release for successive operation the hammer and the gravity means.

11. In a ticket-printing weight scale, the combination of weighing mechanism, ticket-printing mechanism associated therewith including a rotatable type wheel and a gravity actuated hammer above the type wheel, means to hold the hammer in elevated position, mechanism for feeding a strip of tickets to advance the tickets successively to printing position beneath the hammer, means to sever the tickets from the strip, gravity means to actuate the ticket-feeding mechanism and severing means, means to restrain the gravity means, coin-controlled means to release for successive operation the hammer and the gravity means, and means to delay the operation of the ticket-severing means until the ticket-feeding mechanism has been actuated.

12. In a ticket-printing weight scale, the combination of a weighing mechanism, ticket-printing mechanism associated therewith including a rotatable type wheel and a gravity actuated hammer above the type wheel, means to hold the hammer in elevated position, mechanism for feeding a strip of tickets to advance the tickets successively to printing position beneath the hammer, means to actuate the ticket-feeding mechanism and severing means, means to restrain the ticket-feeding mechanism and severing means, and coin-controlled means to release for successive operation the hammer, the ticket-feeding mechanism and the severing means.

13. In a ticket-printing weight scale, the combination of weighing mechanism, ticket-printing mechanism associated therewith including a hammer, mechanism for feeding a strip of tickets to advance the tickets successively to printing position, means for severing the tickets from the strip, gravity means to actuate the ticket-feeding mechanism and severing means, and coin-controlled means to release for successive operation the ticket-printing mechanism, the ticket-feeding mechanism and the severing means including a coin-release lever, a rod connected thereto, a latch disposed in the path of the rod and adapted to restrain the hammer, a dog in the path of the hammer to limit the movement of the latch, and means actuated when the dog is engaged by the hammer to trip the gravity means.

14. In a ticket-printing weight scale, the combination of weighing mechanism, ticket-printing mechanism associated therewith including a hammer, mechanism for feeding a strip of tickets to advance the tickets successively to printing position, means for severing the tickets from the strip, gravity means to actuate the ticket-feeding mechanism and severing means, and coin-controlled means to release for successive operation the ticket-printing mechanism, the ticket-feeding mechanism and the severing means including a coin-release lever, a rod connected thereto, a latch disposed in the path of the rod and adapted to restrain the hammer, a dog in the path of the hammer to limit the movement of the latch, means actuated when the dog is engaged by the hammer to trip the gravity means, and means actuated by the gravity means to return the coin-release lever to its initial position.

15. In a ticket-printing weight scale, the combination of weighing mechanism, ticket-printing mechanism associated therewith including a hammer, mechanism for feeding a strip of tickets to advance the tickets successively to printing position, means for severing the tickets from the strip, gravity means to actuate the ticket-feeding mechanism and severing means, and coin-controlled means to release for successive operation the ticket-printing mechanism, the ticket-feeding mechanism and the severing means including a coin-release lever, a rod connected thereto, a latch disposed in the path of the rod and adapted to restrain the hammer, a dog in the path of the hammer to limit the movement of the latch, means actuated when the dog is engaged by the hammer to trip the gravity means, means actuated by the gravity means to return the coin-release lever to its initial position, and means to hold the coin-release lever in its initial position.

16. In a ticket-printing weight scale, the combination of weighing mechanism, ticket-printing mechanism associated therewith including a hammer, mechanism for feeding a strip of tickets to advance the tickets successively to printing position, means for severing the tickets from the strip, gravity means to actuate the ticket-feeding mechanism and severing means, and coin-controlled means to release for successive operation the ticket-printing mechanism, the ticket-feeding mechanism and the severing means including a coin-release lever, a rod connected thereto, a latch disposed in the path of the rod and adapted to restrain the hammer, a dog in the path of the hammer to limit the movement of the latch, means actuated when the dog is engaged by the hammer to trip the gravity means, means actuated by the gravity means to return the coin-release lever to its initial position, means to hold the coil-release lever in its initial position, including a trip lever having its end disposed to be engaged by a coin.

17. In a ticket-printing weight scale, the combination of weighing mechanism, ticket-printing mechanism associated therewith, mechanism for feeding a strip of tickets to advance the tickets successively to printing position, means for severing a ticket from the strip after the printing is effected, and coin-controlled means to release for successive operation the ticket-printing mechanism, the ticket-feeding mechanism and the ticket-severing means including a coin chute, a gate at the mouth of the chute and means to move the gate to obstruct the mouth of the chute when the printing operation is initiated.

18. In a ticket-printing weight scale, the combination of weighing mechanism, ticket-printing mechanism associated therewith, mechanism for feeding a strip of tickets to advance the tickets successively to printing position, means for severing a ticket from the strip after the printing is effected, coin-controlled means to release for successive operation the ticket-printing mechanism, the ticket-feeding mechanism and the ticket-severing means including a coin chute, a gate at the mouth of the chute and means to move the gate to obstruct the mouth of the chute when the printing operation is initiated, and means for locking the gate until the operation is completed.

19. In a ticket-printing weight scale, the combination of weighing mechanism, ticket-printing mechanism associated therewith, mechanism for feeding a strip of tickets to advance the tickets successively to printing position, means for severing a ticket from the strip after the printing is effected, coin-controlled means to release for successive operation the ticket-printing mechanism, the ticket-feeding mechanism and the ticket-severing means, including a coin chute, means for supporting a roll of tickets and means for preventing the introduction of a coin to the chute when the roll is exhausted including a gate at the mouth of the chute, an arm having a follower adapted to rest on the roll of tickets, a connection between the arm and gate, and means for locking the gate until a new roll of tickets is provided.

In testimony whereof we affix our signatures.

GUSTAV F. HOCHRIEM.
FRANK S. DESCHERMEIER.